(12) United States Patent
Belcher

(10) Patent No.: US 6,592,153 B1
(45) Date of Patent: Jul. 15, 2003

(54) HIGH TEMPERATURE END FITTING

(75) Inventor: John R. Belcher, Panama City, FL (US)

(73) Assignee: Wellstream, Inc., Houston, TX (US)

( * ) Notice: Subject to any disclaimer, the term of this patent is extended or adjusted under 35 U.S.C. 154(b) by 0 days.

(21) Appl. No.: 09/689,075

(22) Filed: Oct. 12, 2000

(51) Int. Cl.[7] .......................... F16L 31/00; F16L 33/00
(52) U.S. Cl. ............................. 285/222.2; 285/222.3; 285/342; 277/607; 277/626
(58) Field of Search ........................ 285/222.1–222.5, 285/342, 351, 334.1, 341; 277/607, 616, 626, 603, 604, 606, 615

(56) References Cited

U.S. PATENT DOCUMENTS

| | | | | |
|---|---|---|---|---|
| 2,624,413 A | * | 1/1953 | Mueller et al. | 166/89.1 |
| 3,051,513 A | * | 8/1962 | Watts et al. | 24/463 |
| 3,127,198 A | * | 3/1964 | Orund | 248/49 |
| 4,615,544 A | * | 10/1986 | Baugh | 166/348 |
| 4,679,826 A | | 7/1987 | Olsen | |
| 4,729,583 A | | 3/1988 | Lalikos et al. | |
| 4,906,028 A | | 3/1990 | Yokomatsu et al. | |
| 5,094,297 A | * | 3/1992 | Bridges | 166/208 |
| 5,102,170 A | | 4/1992 | Inoue | |
| 5,207,459 A | | 5/1993 | Glover | |
| 5,297,826 A | * | 3/1994 | Percebois et al. | 285/342 |
| 5,355,961 A | * | 10/1994 | Gariepy et al. | 166/182 |
| 5,639,128 A | | 6/1997 | Belcher | |
| 5,860,682 A | | 1/1999 | Belcher | |

* cited by examiner

*Primary Examiner*—Lynne H. Browne
*Assistant Examiner*—Aaron Dunwoody
(74) *Attorney, Agent, or Firm*—Haynes & Boone, LLP

(57) ABSTRACT

An end fitting in which to receive a flexible pipe end to be joined includes an annular seal unit comprised of a resilient elastomeric composition contained in a tapered rigid housing ring force fit in a tapered recess of a surrounding component so as to engage the outer surface of the received pipe end.

13 Claims, 4 Drawing Sheets

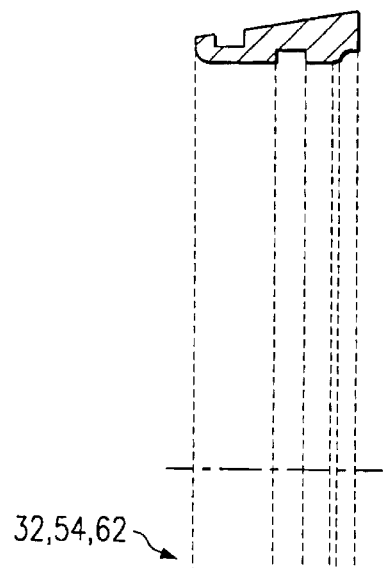
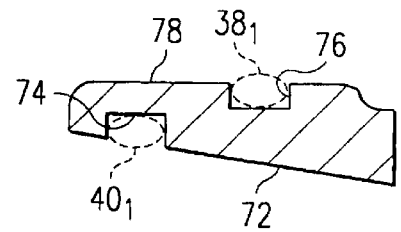
Fig. 6
Fig. 7
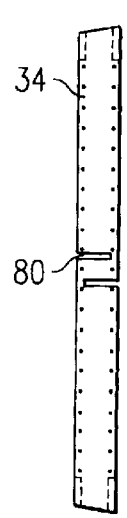
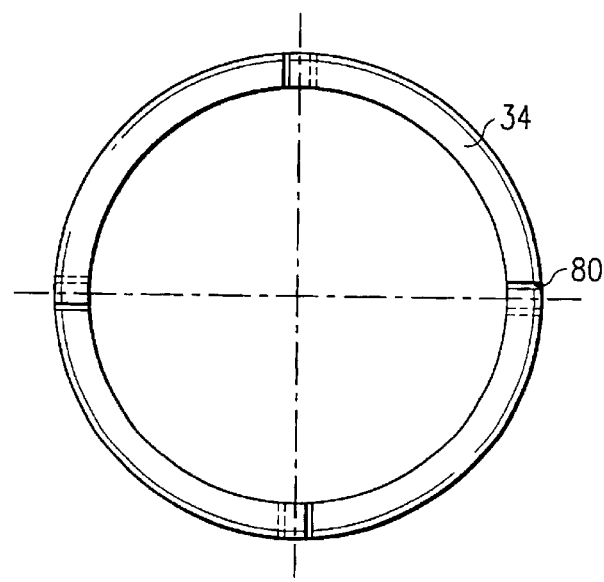
Fig. 8
Fig. 9

HIGH TEMPERATURE END FITTING

FIELD OF INVENTION

The field of art to which the invention relates comprises end fittings that retain and seal at least one open end of flexible plastic pipe for attachment to suitable utilization apparatus.

BACKGROUND OF THE INVENTION

A flexible flowline is comprised typically of several distinct concentric layers that afford strength and flexibility to the flowline. The innermost layer, known as the carcass, prevents collapse of the flowline due to external hydrostatic pressure. The immediately adjacent layer, known as the barrier, is constructed from a synthetic polymer material and serves to prevent content leakage. There may also be succession of other layers of varying materials forming the overall composite of the flowline.

A flexible flowline may be utilized, for example, as a dynamic riser to couple a rigid flowline or another flexible flowline on the seabed to a floating vessel or buoy to convey production fluids such as oil, gas or oil/gas mixtures under pressure from an oil/gas well or platform to the vessel or buoy. An end fitting can be utilized to couple the flexible flowline at each end to an adjacent flowline or wellhead and the vessel or buoy.

One or more leak-tight seals contained in the end fitting has been achieved in the manner of the prior art utilizing a seal ring which, for example, encircles and engages the external surface of the barrier layer. This ring holds the barrier and carcass layers in position within the end fitting by a frictional force generated from the pressure of the seal ring on the barrier layer.

While functioning well, problems with the foregoing seals have arisen inside the end fitting where the flowline and end fitting are subjected to extreme fluctuations in temperature. Such extremes are known to occur in the flowline and end fitting when they are, for example, subjected to repeated changes in temperature as where, the flowline may be exposed to a temperature in excess 100° C. when production fluid is conveyed through the flowline and subsequently may be exposed to temperatures on the order of 0° C. from sea water when flow of the production fluid is interrupted or discontinued.

Repeated thermal cycling in the foregoing manner can result in a loss of seal integrity due to stress relaxation and creep of the barrier layer, followed by loss of compression at the seal. That is, with the seal area being highly stressed in compression, the flowline material at the beginning of service is often in its most highly plasticized state. This, however, deteriorates with time until ultimately a loss in barrier thickness occurs and a state of equilibrium is reached. Once compression at the interface of the seal ring and barrier declines to a low but non-zero level, loss of fluid content in the flowline can occur. Phenomena such as thermal expansion and creep can work to reduce or eliminate compression between the seal ring and the polymer layer.

Various forms of end fittings are disclosed in U.S. Pat. Nos. 1,817,776; 2,264,480; 2,341,164; 2,444,380; 3,995,897; 4,773,680; and 5,639,128.

Despite recognition of the foregoing, it has not been known heretofore how to satisfactorily eliminate the loss of tension and sealing of the flowline that can occur as described.

OBJECTS OF THE INVENTION

It is therefore an object of the invention to provide an enhanced seal for an end fitting capable of increasing the sealing properties against a flowline received therein.

It is further object of the invention to effect the previous object with a seal that is operative to compensate or be unaffected by adverse thermal effects encountered during service.

It is a further object of the invention to effect the previous objects with a seal of economical construction so as not to contribute to costly increases in the overall cost of the fitting.

SUMMARY OF THE INVENTION

This invention relates to an improved seal construction for an end fitting in which an open end of flexible flowline is to be received. More specifically, the invention relates to such an end fitting in which a novel seal construction is provided capable of functioning to compensate, offset or be unaffected by the adverse effects of temperature swings to which the fitting is exposed in service.

The foregoing is achieved in accordance with the invention by means of one or more seal units containing resilient seals of selected shape and assembled into a seal housing ring having a tapered outer surface received in a complementary recess of a surrounding wall. The housing ring may contain a sole or opposite resilient seals assembled thereon. The ring with seals is then axially forced into the surrounding recess by means of a displaceable drive ring. This reduces the inside diameter of the housing ring by forcing it onto a mating part of the end fitting which has a diameter smaller than that of the housing ring. As a result of the foregoing, the seal, or seals provide a means to seal against an irregular surface which may, for example, be an extruded polymer tube such as the flexbarrier of the received flowline. By forcing the housing ring onto the polymer tube, any surface irregularities are gradually reduced until any gaps between the housing ring and the polymer tube are eliminated. By eliminating the gaps, the problem of potential extrusion of the resilient seal is likewise eliminated.

A key to operability of the seal unit is the use of a compressible metal or relatively hard polymer housing for the seal to deform the mating layer in such a way as to eliminate the gaps. For these purposes, the seal housing may comprise an annealed corrosion resistant metal, a relatively hard polymer such as polyphenylene sulfide or other deformable material compatible with fluids to be conveyed through the flowline. Such construction can be used to seal high pressures since extrusion of the resilient seals is precluded. At the same time, the seal is superior to existing mechanical seals used in flexible pipes or hoses since mechanical seals require mechanical compression between the seal ring and the polymer layer. Moreover, the construction is not limited to the fluid sealing layer of flexible pipe since it can be readily applied to any extruded polymer layer of a flexible pipe or hose.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 6 is a sectional elevation of the seal housing of the invention;

FIG. 7 is an enlarged sectional view of the encircled portion 7—7 of FIG. 6;

FIG. 8 is a side elevation of the seal drive ring; and

FIG. 9 is a front elevation of the seal drive ring.

DESCRIPTION OF THE PREFERRED EMBODIMENT

Figure 1:
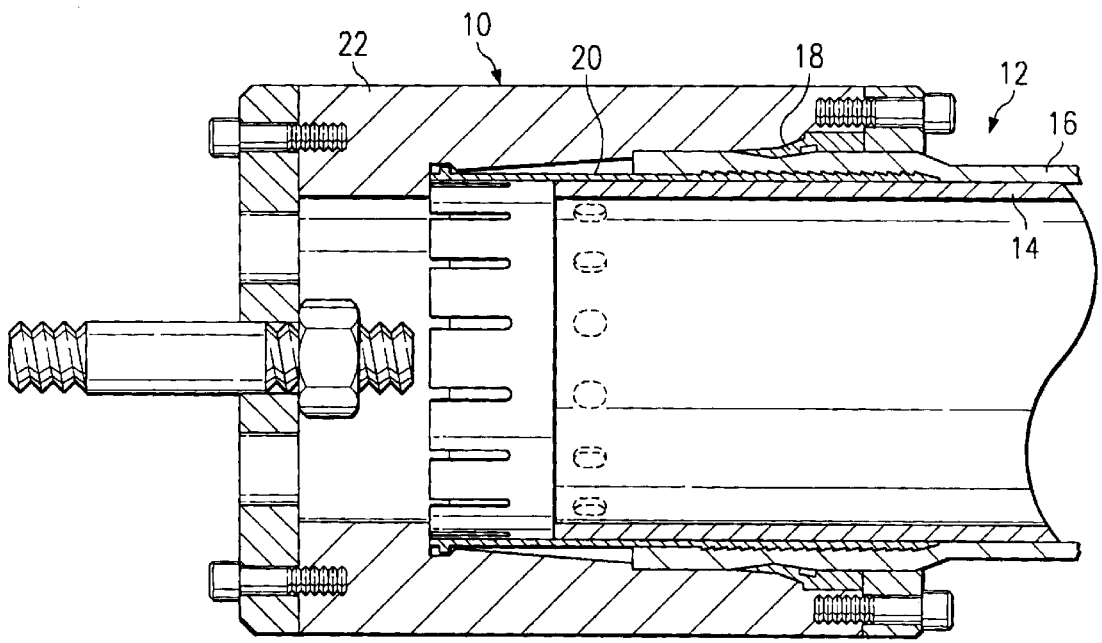
FIG. 1 is a sectional view of a prior art end fitting containing a received pipe end to be secured.

In the description which follows, like parts are marked throughout the specification and drawings with the same reference numerals receptively. The drawing figures are not necessarily to scale and in certain views, portions may have been exaggerated for purpose of clarity.

Referring now to FIG. 1 of the drawings, there is illustrated a prior art end fitting designated 10 as disclosed, for example, in U.S. Pat. No. 5,639,128 incorporated herein by reference and available from commercial sources such as Wellstream, Inc. of Panama City, Fla. Briefly, the end fitting 11 receives a flexible flowline 12 including a carcass layer 14 and a barrier layer 16. An inner seal ring 18 presses against the external surface of barrier layer 16. A sleeve 20 is received intervening between carcass 14 and barrier 16. As shown, seal 18 is compressed between the interior body wall surface 21 and the exterior surface of barrier layer 16.

Figure 2:
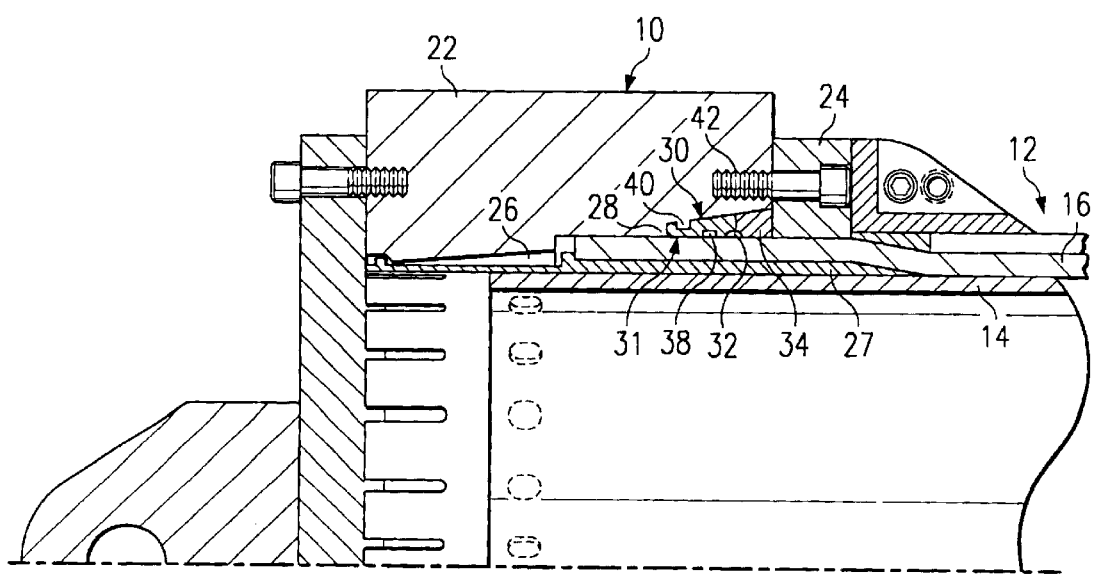
FIG. 2 is a sectional view of an exemplary end fitting containing the improved seal unit construction in accordance with the invention.

Referring to FIG. 2, the exemplary end fitting 10 hereof includes an annular body 22, an inner collar 24, a body ring 26 and a barrier sleeve 27. A counter-bore 28 in body 22 defines a wedge-like tapered recess 30 in which to receive a tapered wedge-shaped seal unit 31 in accordance with the invention as will be described. The seal unit 31 comprises a housing ring 32 and a housing drive-ring 34 both forced into the wedge-like recess 30 in the course of bolts 42 being tightened so as to condense and wedge housing ring 32 inwardly within the recess. On bolts 42 being tightened, elastomer seal 38 between the barrier wall of pipe end 12 and ring 34 is compressed while opposite seal 40 is compressed concomitantly between the inner surface of recess 30 and the ring 34.

Figure 3:
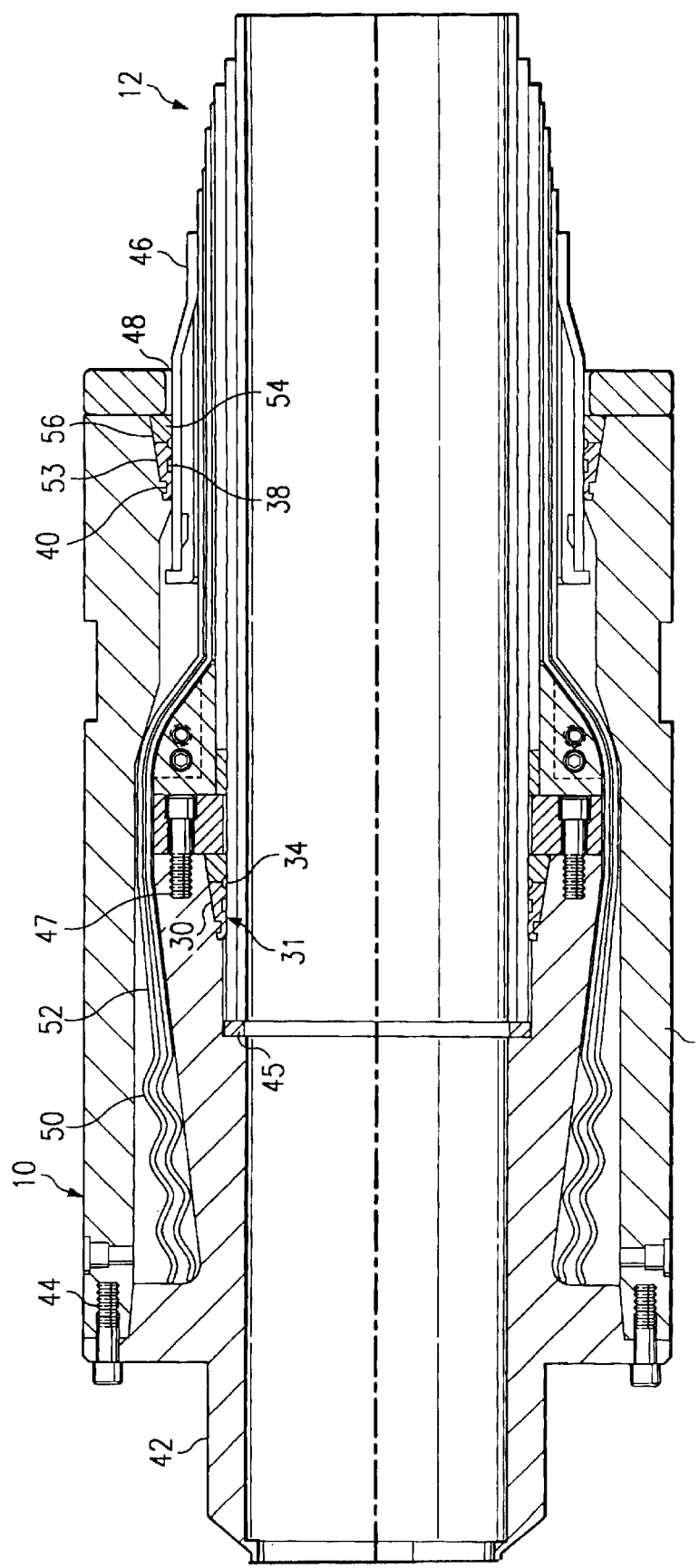
FIG. 3 is a further sectional view of an end fitting containing multiple seal constructions in accordance with the invention.
Figure 4:
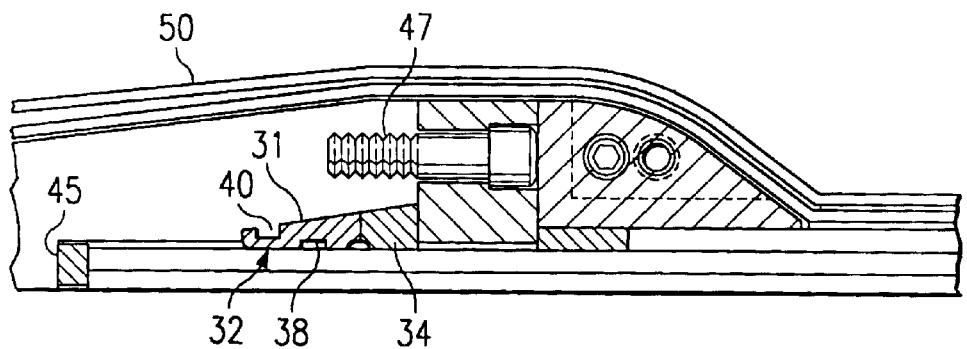
FIG. 4 is an enlarged sectional elevation of a seal hereof as utilized in the end fitting of FIG. 3.

As shown in FIGS. 3 and 4, end fitting 10 includes a tubular insert 42 secured via bolts 44 to body 22. A counter-bore 45 within insert 42 accommodates receipt of flexible pipe end 12 while an internally extending plastic cover 46 encircles the pipe about entrance 48. Corrugated wires 50 are secured in epoxy 52 that serve to maintain integrity of the unit. Contained within the end fitting are an inner seal unit 31 with its housing ring 32 in tapered recess 30 and an outer seal unit 53 with its housing ring 54 in tapered recess 56. Both housing rings, are identical with the latter including opposite elastomeric seals 38 and 40 compressed intervening between the surface of recess 56 and plastic cover 46. As above, the drive ring 34 and housing ring 32 are forced axially inward of recess 30 when tightening bolts 47.

Figure 5:
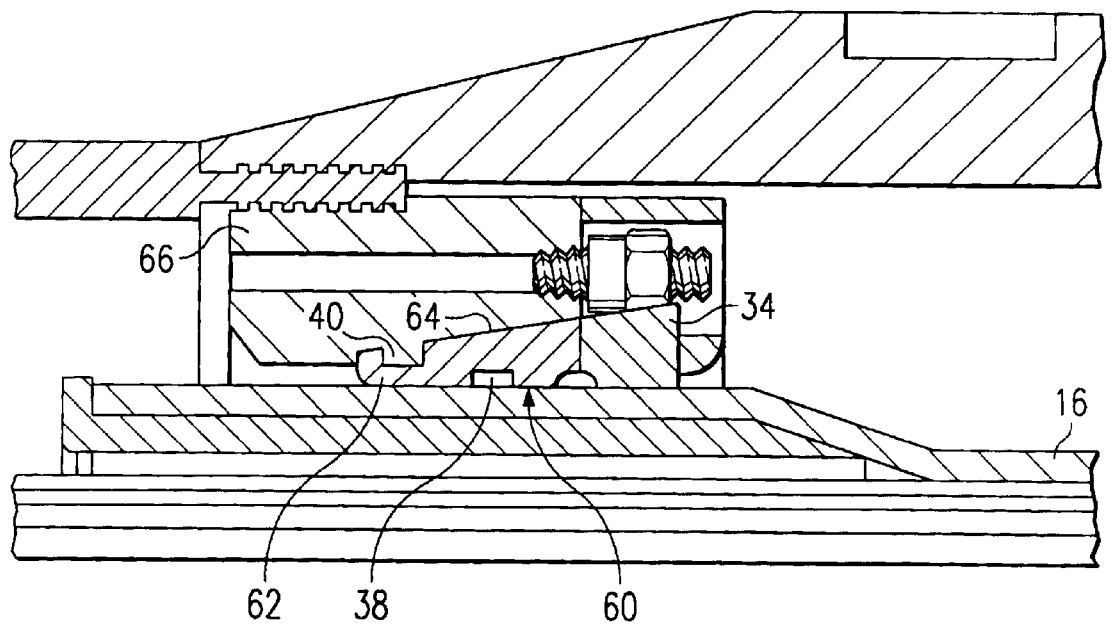
FIG. 5 is a further enlarged sectional elevation of a seal construction at a different location in an end fitting in accordance with the invention.

Some end fitting constructions may optionally also include a middle seal unit 60 similar to and axially between inner and outer seal units 31 and 53 above as best seen in FIG. 5. Housing ring 62 is wedged into tapered recess 64 of a collar 66. Included within housing ring 62 are opposite elastomeric seals 38 and 40 as above.

As best seen in FIGS. 6 and 7, the various housing rings 32, 54, and 62 are formed of hard metal, cross sectionally tapered about their annular peripheries 72. O.D. 72 of the ring includes an annular groove 74 in which to contain an elastomeric, resilient and preferably O-ring seal 40. Optionally, one or more of the rings can also include an internal groove 76, about the interior surface 78 for receiving an additional and similar O-ring seal 38. It will be appreciated that sealing can be effective with only an inner o-ring 38 using a metal-to-metal seal about the exterior. However, also using an exterior O-ring 40 affords more forgiving of surface imperfections.

As shown in FIGS. 8 and 9, the hard metal drive rings 34 are tapered similarly as the housing rings and include side cuts 80 to permit a controlled collapse in the course of being forced into its receptive recess behind a seal ring. The resilient seals 38, 40 can be O-ring, cup seal, X-ring, or other suitable shape that can be assembled into a receptive groove within a housing ring 32, 54 and 62. On being forced into an encircling body with a matching taper but having a diameter smaller than that of the housing ring the inside diameter of the housing ring is caused to be reduced.

In this manner, sealing is provided and maintained against any irregular surface which may be an extruded polymer tube such as barrier 16. By forcing the housing ring onto the polymer tube, any irregularities are gradually reduced until gaps between the housing ring and the polymer tube are eliminated. By eliminating the gaps, the potential for extrusion of the resilient seal is likewise eliminated.

Significant for the foregoing is the use of a compressible metal seal housing ring or relatively hard polymer housing ring for the seal to deform the mating layer in such a way as to eliminate gaps. The design can be used to seal high pressures since extrusion of the resilient seal is avoided. Moreover, it is superior to existing mechanical seals used on flexible pipes or hoses since mechanical seals require mechanical compression between the seal ring and the polymer layer. Phenomena such as thermal expansion and creep can work to reduce or eliminate such compression.

At the same time, such construction is not limited to the fluid sealing layer of flexible pipe, since it can be readily applied to any extruded polymer layer in a flexible pipe or hose. By means thereof, a resilient seal applied directly to an extruded polymer layer, and housed in a metal housing which is forced onto the polymer layer to eliminate gaps, the previous problems associated with temperature induced seal failure in an end fitting is substantially if not completely eliminated.

By the above description there is disclosed a novel seal construction for an end fitting that contributes significantly to the overall reliability of the end fitting per se. It achieves the intended result with only minor changes in construction so as not to contribute to any significant cost increase in manufacture of the overall end fitting. The virtues thereof can be readily appreciated by those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. An end fitting in which to receive an open end of flexible pipe, the end fitting comprising:

a rigid component defining an internal central passage in which a flexible pipe end is to be received, an internal annular tapered recess defined in the rigid component to surround a received pipe, a seal unit having a generally triangular cross section within the recess at the inlet end of said passage to surround a received pipe, said seal unit within the recess of said component operatively effective to seal against leakage, said seal unit comprising:

an annular member having a generally triangular cross section within the recess of said component to contiguously surround the periphery of a received pipe end, and at least one annular seal of resilient composition supported about the interior surface of said member for effecting a seal against at least the outer surface of a pipe end received in said component in which said annular member defines an annular groove in its inner surface in which said seal is contained for the seal thereof to engage the exterior surface of a received pipe end.

2. An end fitting in accordance with claim 1 in which said seal unit includes a tapered, annular drive ring contiguously behind said annular member end that is wedged into said recess in response to a received axial force applied to said drive ring for displacing said annular member axially into the tapered recess of said component.

3. An end fitting in accordance with claim 1 in which said component comprises an annular wall surrounding said annular member and said wall on its interior surface defines said tapered recess containing said seal unit.

4. An end fitting in accordance with claim 3 in which said annular member defines an annular groove on both the interior and exterior surfaces thereof and a resilient seal is contained within each groove of said annular member.

5. An end fitting in accordance with claim 3 including a plurality of said seal units contained at axially spaced apart locations within the end fitting to individually prevent leakage at their respective locations.

6. An end fitting in accordance with claim 2 in which said drive ring is diametrically collapsible in the course of being forced into the tapered recess of said component.

7. An end fitting in accordance with claim 6 in which said drive ring is of a hard metal composition and there is provided bolt means which when tightened apply said axial force to displace both said drive ring and said annular member into the tapered recess of said component.

8. An end fitting in which to receive an open end of a flexible pipe, the end fitting comprising:

an annular body defining an internal central passage in which the open end of the flexible pipe is to be received, wherein the central passage has an internal tapered surface which, when mated to the open end of the flexible pipe defines a recess, a housing ring adapted to be fully positioned within the recess, wherein the housing ring has a generally triangular cross section shape and is adapted to contiguously surround an outer surface of the flexible pipe, and at least one annular seal of resilient composition supported by the housing ring for effecting a seal between the outer surface of the flexible pipe and the internal tapered surface of the annular body.

9. The end fitting of claim 8 further comprising an annular drive ring positioned contiguously adjacent to the housing ring, wherein the annular drive ring is adapted to receive an axial force for displacing the annular drive ring axially into the recess.

10. The end fitting of claim 8 wherein the housing ring has a peripheral groove circumscribing an exterior side of the housing ring.

11. The end fitting of claim 10 wherein the at least one annular seal is a flexible O-ring sealing member positioned within the peripheral groove such that a portion of the flexible O-ring sealing member is adapted to engage an interior surface of the annular body.

12. The end fitting of claim 8 wherein the housing ring has an interior groove circumscribing an interior side of the housing ring.

13. The end fitting of claim 12 wherein the at least one annular seal is a flexible O-ring sealing member positioned within the interior groove such that a portion of the second flexible O-ring sealing member is adapted to engage an exterior surface of the flexible pipe.

* * * * *